United States Patent Office 3,236,802
Patented Feb. 22, 1966

3,236,802
KAOLIN CLAY COATED WITH NEUTRALIZED MONOMERIC AMINOALKYL ESTER OF METHACRYLIC ACID AND POLYESTER RESINS CONTAINING THE SAME
Thomas H. Ferrigno, Metuchen, N.J., assignor to Minerals & Chemicals Philipp Corporation, Menlo Park, N.J., a corporation of Maryland
No Drawing. Filed Dec. 18, 1961, Ser. No. 160,244
6 Claims. (Cl. 260—40)

The subject invention relates to kaolin clay which is coated with a polymerizable organic monomer and relates also to improved polyester resin compositions formulated with the novel coated clay.

Kaolin clay, in its naturally occurring hydrophilic state, is used as a mineral filler in the production of thermoset plastics from liquid unsaturated polyester resins. The clay is mixed with a liquid polymerizable unsaturated polyester resin and the mixture, together with a peroxide catalyst and frequently auxiliary ingredients, is cured to crosslink the polyester into a thermoset plastic product. Usually glass fibers are included in the composition as a reinforcing agent. In the case of polyester premixes (frequently called "doughs" or "gunks"), the glass fibers are uniformly mixed with the liquid polyester and filler and the thick mass is molded. In carrying out the so-called "preform" method, a mixture of polyester and filler is impregnated on a mat of glass fibers and the impregnated glass is molded to produce a thermoset glass laminate. The clay is used principally as a bulking agent and also to minimize shrinkage of the resin during curing. The clay is not used, however, to improve the strength of the thermoset resin and, in fact, the use of naturally occurring clay in large quantities usually appreciably reduces the tensile and flexural strength of the plastic product, particularly in premixes.

Furthermore, the clay being hydrophilic in nature, is not readily wet by the liquid polyester resin and it is difficult to disperse the clay in the liquid resin. When used in appreciable quantity, the clay increases the viscosity of the liquid polyester to a considerable degree and produces a marked thixotropic effect. In some instances, the resultant thickening effect is desirable and for certain vertical molding layups and coating applications, thixotropy in polyester resins is highly desirable. However, in many other instances a marked thickening effect of the clay on the polyester resin is very undesirable inasmuch as it limits significantly the quantity of clay filler which can be incorporated into the polyester while providing a mixture of moldable consistency.

A principal object of my invention is the provision of a novel organic coated kaolin clay having organophilic properties. A more particular object is to provide a finely divided kaolin clay product especially useful as a reinforcing filler in a thermoset resin prepared from a liquid unsaturated polyester resin. Another object is to provide coated kaolin clay particles which can be dispersed readily in liquid unsaturated polyester resins in appreciable quantities without significantly increasing the viscosity of the resin. Still another object of my invention is the provision of organic coated kaolin clay which, when used as a filler in plastics made from liquid unsaturated polyester resins, results in a composition having greater tensile strength and flexural strength than plastics made with the uncoated clay as a filler. A further object of my invention is the provision of improved molding compositions containing liquid polymerizable unsaturated polyester resins.

Further objects and features of the invention will be apparent from the description thereof which follows.

I have discovered that the usefulness of kaolin clay as a filler in plastics prepared from liquid polymerizable unsaturated polyester resins may be improved by coating particles of the clay, prior to its incorporation into the liquid resin, with a neutralized monomeric N-alkyl substituted aminoalkyl ester of methacrylic acid.

Briefly stated, the novel filler of my invention consists of kaolin clay, the particles of the clay being uniformly coated with a small amount (i.e., from about 0.25 to about 5.0 percent, based on the weight of the clay dried to constant weight at 220° F.) of a N-alkyl-aminoalkyl methacrylate monomer which has been neutralized to its equivalence point by titration with an acid, said monomer having the following structural formula:

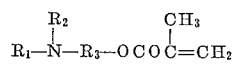

wherein $R_1$ is an alkyl group having from 1 to 4 carbon atoms, $R_2$ is selected from the group consisting of alkyl groups having from 1 to 4 carbon atoms and hydrogen, and $R_3$ is an alkylene group having from 1 to 6 carbon atoms.

The coated kaolin clay product described above is useful in the production of molded plastics from polymerizable liquid unsaturated polyesters by both the premix and preform methods, especially the former. In both types of molding compositions, the coated clay product may be dispersed more readily in the liquid polyester than the normally hydrophilic naturally occurring clay. The viscosity of unsaturated liquid polyester compositions containing coated clays of this invention is less than or about the same as the viscosity of the liquid polyester containing the same quantity of uncoated clay of the same particle size. The viscosity will vary with the quantity of coating agent used and with the particle size of the clay. In the case of premixes or "gunks," as they are usually called, the thermoset resin filled with the coated clay has appreciably higher tensile strength and flexural strength than a like resin filled with the same quantity of naturally occurring clay of the same or finer particle size. When the coated clay is a coarse size fraction of kaolin, the flexural strength will be generally greater than the flexural strength of the unfilled molded resin. In preforms, the use of the coated clay will result in a laminate having higher flexural strength than a laminate prepared with uncoated clay.

The preparation of monomeric N-alkyl substituted aminoalkyl esters of methacrylic acid, employed in producing the clay coating agent in accordance with this invention, is described in British Patent No. 475,131 of E. I. du Pont de Nemours and Company, November 15, 1937. The preparation involves esterification of methacrylic acid, anhydride, halide or ester with a suitable N-substituted alkanolamine, such as beta-dimethylaminoethanol or 2-(diethylamino)cyclohexanol. At present N-alkyl substituted aminoethyl methacrylates are commercially available, namely beta-dimethylaminoethyl methacrylate (or 2-dimethylaminoethyl methacrylate), beta-diethylaminoethyl methacrylate and t-butylaminoethyl methacrylate. However, other N-substituted aminoalkyl methacrylates, such as N-substituted aminoethyl methacrylates and aminobutyl methacrylates, should be satisfactory when they become available. In producing the clay coating agent it is essential that the N-substituted alkylaminoalkyl methacrylate monomer be neutralized to its equivalence point since N-alkyl substituted aminoalkyl methacrylate monomers which have not been neutralized or which have been treated with excess acid do not produce the desired results when they are coated on clay. When incorporated into liquid unsaturated polyester resins, clay containing unneutralized monomer or overacidified monomer sometime impart very undesirable rheological properties to the resin. Thus, such coated clay frequently causes the resin to gel or solidify upon standing. Moreover, the strength properties of resins filled with clay coated with unneutralized or over-acidified monomer are very poor as compared with the strength properties obtained using neutralized monomers. The particular acid that is employed to neutralize the methacrylate monomer does not appear to be critical and a wide variety of acids have been used with success. As examples of suitable acids may be mentioned phosphoric, hydrofluoroboric, hydrochloric, sulfuric, hydrofluorosilicic and acetic. It is preferable to neutralize the monomer with acid before coating the clay with the monomer.

The clay that is employed in carrying out this invention is kaolin clay, by which is meant a clay whose predominating mineral species is kaolinite, halloysite, anauxite, dickite or nacrite. These minerals are all hydrous aluminum silicates of the empirical formula $$Al_2O_3 \cdot 2SiO_2 \cdot 2H_2O$$

Kaolin clay, as mined, consists of fine particles together with coarse agglomerates and grit (principally quartz). It is the usual practice of clay processors to remove from the clay coarse agglomerates and gritty matter. For some commercial uses, kaolin clay is fractionated, as by hydraulic or air sedimentation methods, to obtain a fraction of clay having the desired particle size. Usually the clay is fractionated to obtain a very fine fraction which is particularly useful as an ingredient of paper coating compositions. This leaves a coarse fraction, the particle size distribution of which will depend on the amount of fines removed from the whole clay during the fractionation.

In carrying out my invention, I prefer to use a coarse fraction size of clay which has an average equivalent spherical diameter from 4 to 15 microns. The clay is free from grit and particles larger than 44 microns. Whole clay (which usually has an average equivalent spherical diameter of about 1.5 microns) and fine fractions of whole clay can also be used. It is also within the scope of this invention to employ clay which has previously been calcined. All micron particle sizes, as used herein, are expressed as equivalent spherical diameters and are obtained by the well-known Andreasen method (a water sedimentation method) assigning 2.5 as the value of particle density. The term "average equivalent spherical diameter" refers to the particle size of a material which is so chosen that 50 percent by weight of the particles will be finer than that value.

In putting my invention into practice, I uniformly coat the clay particles with a very small quantity of the neutralized alkylaminoalkyl methacrylate coating material. Several methods are suitable for the purpose. The simplest procedure involves dry milling the clay with an appropriate quantity of alkylaminoalkyl methacrylate which has previously been neutralized to its equivalence point with an acid. Inasmuch as the effectiveness of the monomeric coating depends on its uniform distribution on the surface of the clay particles, the neutralized monomer is preferably applied in the form of a solution, such as a solution in a mixture of water and isopropyl alcohol, after which the solvent is removed from the clay and monomer under drying conditions controlled to prevent polymerization of the monomer. The clay can also be coated by slurrying clay with alkylaminoalkyl methacrylate in water and titrating the slurry with an acid until the equivalence point of the monomer is reached. The slurry is then vacuum filtered or reduced to a wet cake by any suitable means, dried at a product temperature not in excess of about 250° F. to remove residual water and then pulverized.

The optimum quantity of neutralized alkylaminoalkyl methacrylate coated on the clay will vary inversely with the particle size of the clay. For example, a coarse size fraction of clay having an average equivalent spherical diameter of about 10 microns is preferably coated with neutralized alkylaminoalkyl methacrylate monomer in amount of 0.5 percent by weight, whereas about 1 to 2 percent of coating is more suitable for 5 micron clay. Larger amounts, such as 5 percent, will be needed to coat 0.5 micron clay. The quantity of coating agent will usually be kept at the minimum at which the coating agent is effective in enhancing the filler properties of the clay since the use of excessive coating agent sometimes reduces the strength of the molded polyester resin which is formulated therewith.

The liquid unsaturated polyester resins employed in producing improved molding compositions of this invention are obtained by reacting together a dihydric alcohol and a dibasic acid, either of which contains a pair of double bonded carbon atoms. The unsaturated long chain polyester molecule is essentially linear and is capable of being cross-linked to form a thermosetting resin solid through the double bonds in the ester. A liquid unsaturated monomer, such as styrene, is employed as a crosslinking solvent, and an organic peroxide is usually employed to catalyze the crosslinking reaction. The unsaturated polyesters are characterized by thermosetting without evolution of water. Commercial unsaturated polyester resins usually contain a mixture of unsaturated polyesters and unsaturated monomeric solvent.

Polyols used in the preparation of commercial polyesters include: ethylene glycol; propylene glycol; 1:3 butylene, 2:3 butylene and 1:4 butylene glycols; diethylene glycol and triethylene glycol.

Maleic anhydride and fumaric acid are the most frequently used unsaturated acids in the preparation of unsaturated polyesters; maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal crosslinking agents.

As mentioned, the crosslinking reaction is catalyzed with a peroxide catalyst, usually benzoyl peroxide. Other catalysts are methyl ethyl ketone peroxide and methyl isobutyl ketone peroxide.

Accelerators, stabilizers, promotors and coloring agents may be incorporated in the polyester when desired, as well as auxiliary fillers such as fibrous asbestos, calcium carbonates, etc.

In the preparation of moldable polyester mixes employing the novel coated kaolin, the clay is added to the unsaturated liquid polyester resin in the same manner and with equipment usually employed for adding clay or other fillers to the resin.

The quantity of coated clay I employ is from 10 to 200 percent, based on the weight of the liquid unsaturated polyester (inclusive of the polymerizable monomer, such as styrene). In the preparation of gunk molding mixtures containing glass fibers I prefer to employ about 50 to 150 parts of coated clay to 100 parts by weight of liquid polyester. In some instances the quantity of glass fibers may be reduced from that normally employed in premixes when my coated clay is used. A suggested proportion of glass fibers is from 10 to 30 parts per 100 parts of polyester. In laminating mixes, I prefer to use from about 20 to 100 parts by weight of coated clay to 100 parts by weight of polyester.

After the coated clay is dispersed in the liquid polymerizable unsaturated monomer and catalyst added, the mixture is placed in a suitable mold and cured in a manner applicable to the particular polyester resin employed.

My invention is illustrated in further detail by the following examples in which all proportions of ingredients are in parts by weight unless otherwise specified.

EXAMPLE I

In accordance with this invention, samples of Georgia kaolin clay were coated with neutralized beta-diethylaminoethyl methacrylate in amount of 0.5 to 2.0 percent (based on the weight of the clay after drying to constant weight at 220° F.). The clays were: a degritted coarse fraction of Georgia kaolin clay having an average equivalent spherical diameter of 4.8 microns and a degritted Georgia kaolin clay having an average equivalent spherical diameter of 1.5 microns.

In the preparation of the various coated clays, the dry clay was placed in a mixing vessel. To the clay there was added slowly with agitation a 10 percent solution of inhibited 2-diethylaminoethyl methacrylate previously neutralized by titration to its equivalence point with an acid. The solvent used in forming the solution was a 50/50 mixture of water and isopropyl alcohol. Mixing of clay with monomer solution was conducted at room temperature. The materials were rapidly agitated for ten minutes after all of the coating material had been added and the wet samples held in a forced draft oven at 160° F. for 1¼ hours for drying. After drying, the samples were placed in a high speed hammer mill particle size uncoated clay at all rates of shear. The data show that a clay filled resin composition having a lower viscosity than the resin without any filler could be formulated by using a coarse size fraction of clay (4.8 micron) previously coated with only 0.5% by weight of neutralized diethylaminoethyl methacrylate. By using a larger quantity of coating more highly thixotropic formulations could be obtained with this clay. Using the 1.5 micron clay, even more thixotropic formulations were produced. The data show also that unneutralized alkylaminoalkyl methacrylate coated clay, outside the scope of this invention, did not possess the excellent dispersion properties of coated clay of this invention.

(1b) The strength characteristics of molded Polylite 8007 resins that were filled with kaolin clays coated with neutralized monomeric beta-diethylaminoethyl methacrylate were measured and compared with the strength characteristics of the same resin filled with (1) the same quantities of uncoated clay and (2) the unfilled resin. To illustrate the necessity for neutralizing the methacrylate monomer, the strength characteristics of kaolin clay coated with unneutralized beta-diethylaminoethyl methacrylate were also measured. The results are tabulated in Table II.

In the preparation of the moldings, portions of the freshly prepared resin-filler mixes of Example 1a were molded after addition of 1 percent of benzoyl peroxide

*Table I*

THE EFFECT OF COATING VARIOUS PARTICLE SIZES OF KAOLIN CLAY WITH MONOMERIC DIETHYLAMINOETHYL METHACRYLATE SALTS ON THE VISCOSITY OF SUSPENSIONS IN AN UNSATURATED POLYESTER RESIN [1]

| Clay Filler Av. Equiv. Spherical Diam., Microns | Clay Coating, Wt. Percent | Brookfield Viscosity, cp.×10³ | | | | Dispersibility of clay |
|---|---|---|---|---|---|---|
| | | Initial | | After 7 days | | |
| | | 10 r.p.m. | 100 r.p.m. | 10 r.p.m. | 100 r.p.m. | |
| No filler | | 4.2 | 4.3 | 4.5 | 4.5 | |
| 1.5 | No coating | 29.5 | 8.6 | 23.5 | 7.6 | Difficult. |
| 4.8 | do | 9.7 | 4.3 | 8.5 | 4.5 | Do. |
| 1.5 | 0.5% DEAEM[2]—H₂SiH₆ salt | 29.5 | 8.5 | 28.5 | 9.6 | Readily dispersible. |
| 1.5 | 1% DEAEM—unneutralized | 21.9 | 7.6 | 24.5 | 8.8 | Very poor dispersion. |
| 4.8 | 0.5% DEAEM—H₃PO₄ salt | 1.4 | 1.6 | 1.7 | 2.0 | Readily dispersible. |
| 4.8 | 1% DEAEM—HBF₄ salt | 8.4 | 3.5 | 8.5 | 4.0 | Do. |
| 4.8 | 2% DEAEM—HSiF₆ salt | 7.4 | 3.2 | 7.7 | 3.6 | Do. |

[1] 40 parts clay/60 parts Polylite 8007 resin.
[2] DEAEM=beta diethylaminoethyl methacrylate.

while they were still hot and the samples, after cooling, were placed in sealed glass jars.

The procedure was repeated using unneutralized 2-diethylaminoethyl methacrylate as the coating agent for clay. In this case water was employed as the solvent for the monomer and drying of the clay slurry was at 250° F. for 2 hours.

(1a) To illustrate that kaolin clay which has been coated with a neutralized monomeric alkylaminoalkyl methacrylate, in accordance with this invention, does not adversely affect the viscosity of a polyester into which it is incorporated, the rheology of unsaturated liquid polyesters containing the coated clay of this invention was compared with the rheology of the polyester containing the same quantity of uncoated clay. Also studied were the dispersion characteristics of coated clay of this invention and clay coated with unneutralized monomeric alkylaminoalkyl methacrylate.

The unsaturated polyester employed in all tests was Polylite 8007, a low reactivity polyester prepared by esterification of ethylene glycol with fumaric acid and containing 40 percent styrene monomer. Viscosity measurements were made immediately after preparation of the polyester compositions and also after the compositions had aged seven days. The results are tabulated in Table I.

The results reported in Table I show that the viscosity of the liquid polyester resin containing coated clay in accordance with this invention was about the same as or less than the viscosity of the resin containing the same catalyst (based on the weight of polyester including styrene monomer). The mixes were cast in a glass mold which consisted of a U-shaped piece of ⅛-inch asbestos gasketing 1-inch wide and having 12-inch legs. Silicone mold releasing agent was applied to the gasket which was placed between two pieces of plate glass (each 1-foot square) and which had been sprayed with mold release agent. This assembly was secured and filled with the resin filler mixture.

The resin was cured by placing the filled mold in a cold forced draft oven and gradually raising the oven temperature to 180° F. over a period of an hour. The temperature was held at 180° F. for one hour and shut off. The mold and oven were permitted to cool to room temperature.

The results given in Table II show that the tensile strength of the cast polyester resin was reduced appreciably by the use of uncoated clays and that coating of the clay with neutralized diethylaminoethyl methacrylate in accordance with this invention reduced the tendency of the clay to reduce the tensile strength and flexural strength of the molded plastic. In contrast, the use of clay coated with unneutralized monomer resulted in plastics having a lower flexural strength than plastics filled with uncoated clay.

The data in Table II show also that the flexural strength of plastics filled with a coarse size fraction of kaolin coated with 0.5 to 2.0 percent of neutral alkylaminoalkyl methacrylate monomer was markedly superior to the flexural strength of the unfilled plastic.

EXAMPLE II

The 4.8 micron clay of Example I was coated with 1 percent by weight of various neutralized amines in-

Table II

THE EFFECT OF COATING VARIOUS PARTICLE SIZES OF KAOLIN CLAY FILLERS WITH MONOMERIC DIETHYLAMINOETHYL METHACRYLATE SALTS ON THE STRENGTH PROPERTIES OF MOLDED UNSATURATED POLYESTER RESIN [1]

| Clay Filler, Av. Equiv. Spherical Diam., Microns | Clay Coating, Wt. Percent | Tensile Strength, p.s.i.×10³ ASTM: D638-58T | Flexural Strength, p.s.i.×10³ ASTM: D790-58T | Barcol Hardness | Comment |
|---|---|---|---|---|---|
| No filler | | 8.47 | 10.25 | 39.5 | |
| 1.5 | No coating | 4.13 | 8.29 | 44.8 | |
| 4.8 | do | 5.34 | 9.69 | 42.8 | |
| 1.5 | 0.5% DEAEM [2]—H₂SiF₆ salt | 4.78 | 9.48 | 45.0 | Definite improvement in flexural and tensile strength. |
| 1.5 | 1% DEAEM—unneutralized | | 7.68 | 45.0 | Reduced flexural strength. |
| 4.8 | 0.5% DEAEM—H₃PO₄ salt | 6.26 | 11.18 | 44.6 | Exceptional improvement in flexural strength and definite improvement in hardness and tensile strength. |
| 4.8 | 1% DEAEM—HBF₄ salt | 5.73 | 11.00 | 43.8 | |
| 4.8 | 2% DEAEM—HSiF₆ salt | 6.11 | 11.07 | 44.0 | |

[1] 40 parts clay/60 parts Polylite 8007 resin.
[2] DEAEM—beta diethylaminoethyl methacrylate.

cluding neutralized amines containing alpha-beta enol unsaturation. The effect of such coatings on the properties of the clay filled Polylite 8007 resin was studied.

The clays were mixed into the polyester employed in Example I, and the Brookfield viscosity and physical properties of the molded resin compositions were investigated as in Example I. The results are summarized in Table III.

A comparison of the results reported in Table III with results reported in Table I and Table II show that plastics filled with kaolin clay coated with a variety of neutralized amines outside the scope of this invention, including several neutralized amines containing alpha-beta enol unsaturation, do not possess the high flexural and tensile strength characteristics of resins filled with coated clays within the scope of this invention.

Also shown is that most of the neutralized amines outside the scope of this invention gelled the polyester resin upon standing.

Table III

THE EFFECT OF COATING 4.8 MICRON KAOLIN CLAY WITH VARIOUS NEUTRALIZED AMINES ON THE PROPERTIES OF POLYESTER RESIN [1] BEFORE AND AFTER MOLDING

| Clay Coating [2] | Tensile Strength, p.s.i.×10³ ASTM: D638-58T | Flexural Strength, p.s.i.×10³ ASTM: D790-58T | Barcol Hardness | Brookfield Viscosity, cp.×10³ | | | |
|---|---|---|---|---|---|---|---|
| | | | | Initial | | After 7 Days | |
| | | | | 10 r.p.m. | 100 r.p.m. | 10 r.p.m. | 100 r.p.m. |
| No filler | 8.47 | 10.25 | 39.5 | 4.2 | 4.3 | 4.5 | 4.5 |
| Uncoated Clay | 5.34 | 9.69 | 42.8 | 9.7 | 4.3 | 8.5 | 4.5 |
| Rosin Amine D Stearate | 5.90 | 9.40 | 45.5 | 1.90 | 1.82 | Partially gelled | |
| Octylamine Acetate | 3.0 | 8.8 | 45 | 3.4 | 2.3 | Rubbery gel | |
| 1 mol Armeen T [3] / 1 mol Acrylic Acid | 2.60 | 7.36 | | 5.5 | 2.25 | 5.5 | 2.39 |
| 1 mol Diethylamine and 1 mol Crotonic Acid | 2.55 | | | 8.1 | 3.1 | gel | gel |

[1] 40 parts clay/60 parts Polylite 8007.
[2] All coating at 1% of clay, based on dry clay weight.
[3] A mixture containing about 2% tetradecylamine, 24% hexadecylamine, 28% octadecylamine and 46% octadecenylamine.

I claim:

1. Naturally occurring kaolin clay, the particles of which are uniformly coated with about ¼% to about 5% by weight of an N-alkylaminoalkyl methacrylate monomer which has been neutralized with an acid to the equivalence point, said monomer having the following structural formula:

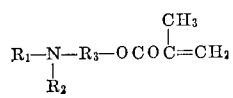

wherein: $R_1$ is an alkyl group having from 1 to 4 carbon atoms, $R_2$ is selected from the group consisting of an alkyl group having from 1 to 4 carbon atoms and hydrogen and $R_3$ is an alkylene group having from 1 to 6 carbon atoms, and said acid is selected from the group consisting of phosphoric, hydrofluoboric, hydrochloric, sulfuric, hydrofluorosilcic and acetic.

2. The composition of claim 1 wherein said monomer is beta-dimethylaminoethyl methacrylate.

3. The composition of claim 1 wherein said monomer is t-butyl aminoethyl methacrylate.

4. The composition of claim 1 wherein said monomer is beta-diethylaminoethyl methacrylate.

5. Naturally occurring kaolin clay having an average equivalent spherical diameter of about 5 microns, the particles of said clay being uniformly coated with about ½% to 2% by weight of an N-alkylaminoalkyl methacrylate monomer which has been neutralized with an acid to the equivalence point, said monomer having the following structural formula:

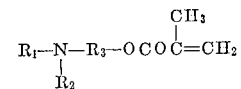

wherein: $R_1$ is an alkyl group having from 1 to 4 carbon atoms, $R_2$ is selected from the group consisting of an alkyl group having from 1 to 4 carbon atoms and hydrogen and $R_3$ is an alkylene group having from 1 to 6 carbon atoms, and said acid is selected from the group consisting of phosphoric, hydrofluoroboric, hydrochloric, sulfuric, hydrofluorosilicic and acetic.

6. A liquid polymerizable unsaturated polyester resin containing from about 10% to about 200% by weight of the product of claim 1, said resin being the reaction product of a polyhydric alcohol and at least one unsaturated dibasic acid.

References Cited by the Examiner
UNITED STATES PATENTS 2,999,080  9/1961  Wilcox _____ 260—40
3,032,431  5/1962  Ferrigno _____ 260—40

MORRIS LIEBMAN, *Primary Examiner.*
ALPHONSO D. SULLIVAN, *Examiner.*
T. D. KERWIN, *Assistant Examiner.*